United States Patent [19]

Abrahamson

[11] 4,211,184
[45] Jul. 8, 1980

[54] MILKING

[76] Inventor: John H. Abrahamson, R.D., Cambridge, New Zealand

[21] Appl. No.: 883,847

[22] Filed: Mar. 6, 1978

[30] Foreign Application Priority Data

Mar. 28, 1977 [NZ] New Zealand ............. 183708

[51] Int. Cl.² ................................ A01J 5/04
[52] U.S. Cl. .................... 119/14.02; 119/14.44; 119/14.52
[58] Field of Search .............. 119/14.02, 14.36, 14.37, 119/14.31, 14.32, 14.38, 14.52, 14.53, 14.44

[56] References Cited

U.S. PATENT DOCUMENTS

| 3,255,732 | 6/1966 | Raht | 119/14.52 |
| 3,482,547 | 12/1969 | Maier | 119/14.36 |

Primary Examiner—Hugh R. Chamblee

[57] ABSTRACT

A teat cup is provided with a sensing diaphragm in the mouth piece and is connected by a linkage to a valve operating on the air line inlet to the pulsator chamber. Variation of the vacuum level within the ring chamber causes the valve in the air line to open and close to thereby affect the vacuum level applied to the pulsator chamber. A method of milking is described in which sensing of the vacuum level within the ring chamber enables control of the vacuum level applied to the pulsator chamber so that a high vacuum within the ring chamber, for example when a teat cup is first applied to an unstimulated teat, will cause the vacuum in the pulsator chamber to drop thereby closing the inflation to close off communication between the milk line and the teat allowing the teat to be stimulated to let down milk.

19 Claims, 1 Drawing Figure

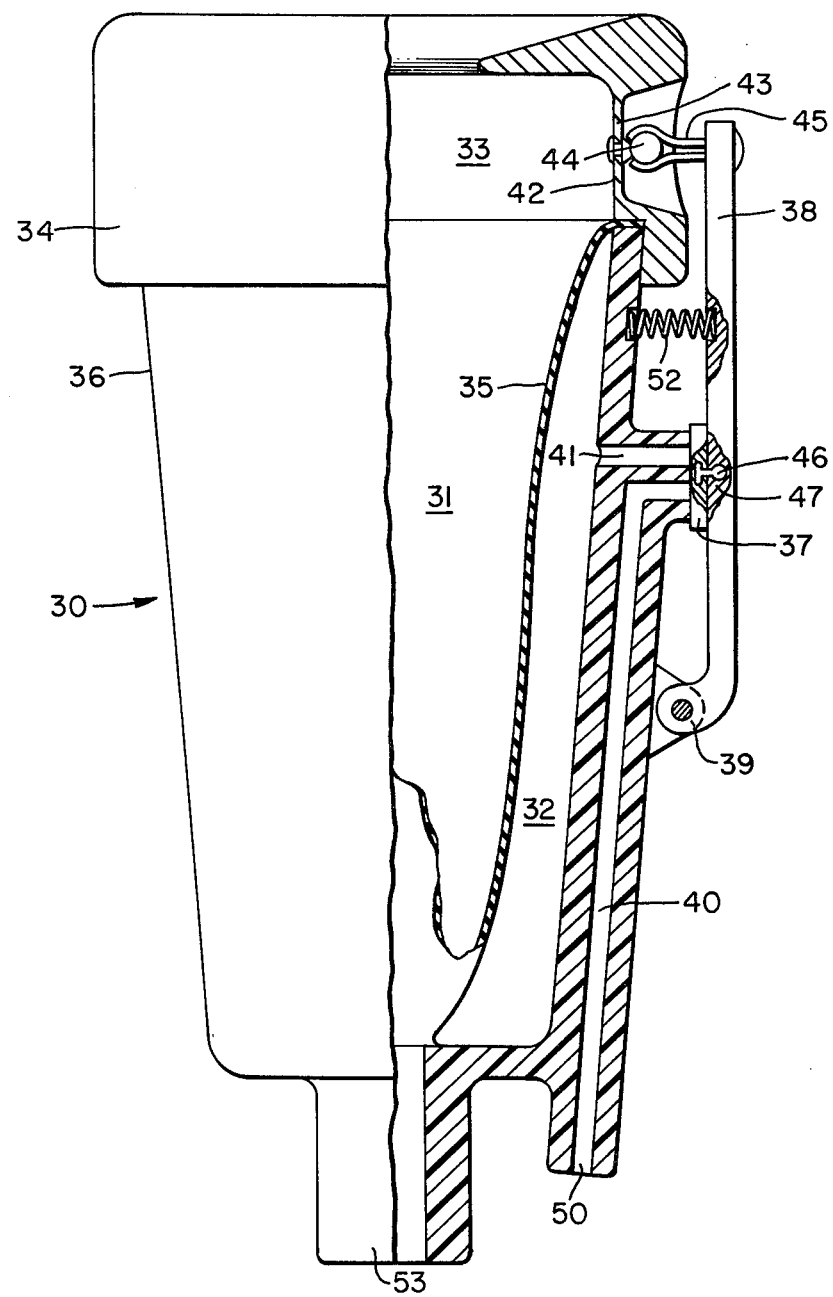

MILKING

This invention relates to improvements in methods and/or apparatus for milking and more particularly concerns a method of milking whereby vacuum damage to the animals teats is minimised.

It has been found that present milking techniques have been unable to overcome a problem of extracting completely milk from the teat of the animal, without increasing the possibility of mastitis infection of the teats and also creating problems of exposing the teats to excessive vacuum which causes damage and irritation to the teats.

It has been found that in practise, although the milk line vacuum and air line vacuum are set at the same predetermined maximum in actual fact the milk line vacuum drops below that of the air line. This phenomena is believed to be generally created by the vacuum levels being equal at source, but when the milk line becomes full of milk, a head of milk (extending from the teat cup inflation up to the milk line overhead,) reduces the vacuum level in the milk line to the interior of the teat cup inflation, by in some cases 3"-4" of mercury. It is believed that this vacuum difference leads to the teat cup inflation "ballooning" away from the teat and thus subjecting the exposed teat surface to high levels of vacuum with resultant stretching of the teat orifices and damage to the teat. It is also believed that as the inflation "balloons" away from the side of the teat, the weight of the teat cup has to be supported by the ring or mouth piece and its associated vacuum. Furthermore, if the inflation "balloons" away from the side of the teat, the vacuum in the ring chamber rises and a high vacuum is experienced by the base of the teat. This is believed to give rise to a blue ring around the base of the teat which is associated with damage to the inner lining of the teat wall as well as cracking of the teat base and possible strangling of the teat base thereby reducing the milk flow from the udder.

It is also believed that where milking is continued until the cow is exhausted, or until the total milk flow from the animal drops to below a predetermined value, it may arise that one teat exhausts before the others, with the possibility of vacuum entering the teat interior and back jetting from the milk ejected from the other teats, possible being pumped into the interior of the exhausted teat. It is thus possible that bacteria associated with one teat may be passed directly to the interior of another teat, thus increasing the risk of infection.

Whilst the introduction of teat stimulators has reduced the inflammation problem to some extent, the problem has not completely been eliminated, with the resultant effect of an uneconomic delivery of milk combined with a possible high risk of infection.

Apart from vacuum damage, unstimulated teats of teats that exhaust early can give rise to cup crawl. That is to say, as the teat becomes slack, more and more of the teat is drawn down into the teat cup interior, with possible stretching of the teat as the cup "crawls" relatively upwards. In such a case, the weight of the teat cup is borne only by the mouth piece of the ring chambers, and to overcome cup crawl, it has hitherto been the practise to weight the teat cup cluster, with consequent pressure on the cow and discomfort by the drag on the teat. In addition, existing teat cups require a hard mouth piece to grip the base of the teat under high vacuum. This can also give rise to discomfort.

Attempts have been made to produce teat cups which conforms snuggly to the shape of the animal's teats by virtue of the size of the mouth piece and in particular the inflation. However, what may be comfortable to one animal can cause sores, extreme discomfort and pain to another animal. Not only do the teat sizes vary between different breeds, but they also vary within a particular herd and sometimes vary on a particular animal.

It is an object of this invention to go someway to overcoming the above mentioned problems, or at least to provide the public with a useful choice.

Other objects of this invention will become apparent from the following description.

According to one aspect of this invention, there is provided a method of milking an animal including applying a teat cup to a teat to be milked; the teat cup having an inflation and a mouth piece; the interior of the inflation being in communication with a milk line connected to a source of vacuum; the exterior of the inflation being in communication with a pulsating vacuum source; characterised in that the level of vacuum within the mouth piece is monitored and is used to control the level of vacuum applied to the exterior of the inflation.

According to a further aspect of this invention, there is provided a teat cup including: a casing; an inflation mounted within said casing; a mouth piece connected to said inflation; means for sensing a vacuum level within said mouth piece; and means for controlling a vacuum level applied to the exterior of said inflation.

Other aspects of this invention which should be considered in all its novel aspects will become apparent from the following description, which is given by way of example only, with reference to the accompanying drawings, in which:

FIG. 1: is a part-sectional view of a teat cup having a sensor on the mouth piece.

FIG. 1 illustrates a teat cup embodying means for controlling the vacuum applied to the pulsator chamber. This is achieved by monitoring the vacuum level in the ring chamber.

Teat cup 30 has a teat chamber 31, a pulsator chamber 32, and a ring chamber 33 defined by the mouth piece 34. The teat chamber and pulsator chambers being separated by an inflation 35, and surrounded by a casing 36. The teat chamber 31 having an outlet 53 connectable to a milk line.

The pulsator chamber has provision for connection to an air line 50 by way of ports 40, 41. A regulator valve is provided by way of diaphragm 37 adapted to close off inlet port 40 and as illustrated passes over both inlet port 40 and port 41.

Both ports and the diaphragm can be built into the teat cup casing 36. In addition, sensing means is provided on the mouth piece. This can be a diaphragm 42 positioned in the mouth piece 34 by forming a portion of the mouth piece or ring chamber wall relatively thin, so that the diaphragm 42 separates the exterior atmospheric pressure from the vacuum level within the ring chamber. The sensing diaphragm 42 is coupled to the valve diaphragm 37 by means of a linkage 38.

This is shown to be a linkage arm 38 pivoted at 39, releasably connected to sensing diaphragm 42 and biased away from sensing diaphragm 42 by spring 52.

Conveniently, the sensing diaphragm 36 is provided with a nipple 44 to co-operate with snap fit jaws 45 on the linkage 38 so that the linkage 38 can be readily removed from the sensing diaphragm for ease of cleaning.

The valve diaphragm 37 is preferably releasably connected to linkage arm 38 by a nipple 46, of for example rubber, capable of fitting within a recess 47 in the linkage arm.

The linkage arm could be provided with an extension beyond pivot point 39 for direct manual operation, or the linkage arm could be connected to a switch to lock the arm in a particular setting. By this means, it is possible to provide a manual over-ride on the linkage so that movement of the switch or direct pressure on the extension of the linkage arm could be used to lift valve diaphragm 37 to open communication between ports 40, 41 to enable the level of vacuum in the pulsator chamber to be controlled manually and independently of the level of vacuum within the ring chamber.

In operation, an increase in the vacuum level within the ring chamber 33 tends to pull diaphragm 42 towards the interior of the ring chamber.

It will be appreciated that this operates to pull linkage 38 towards the ring chamber and thus exert pressure on the valve diaphragm 37. This latter closes off the communication between ports 40 and 41. Thus, a high vacuum within the ring chamber 33 tends to close valve diaphragm 37 and prevents the vacuum in the pulsator chamber from increasing beyond a level set by the vacuum in the ring chamber. On the other hand, as the vacuum in the ring chamber decreases, the sensing diaphragm is allowed to flex outwardly thus relieving the pressure on diaphragm 37 and allowing communication between the ports 40 and 41. By this means, a low vacuum in the ring chamber 33 allows for a high vacuum in the pulsator chamber 32.

If desired, a small hole 43 or vacuum valve, may be provided in the mouth piece to allow leakage of air into the ring chamber and thus variation in the ring chamber vacuum. In the majority of cases, some leakage occurs between the mouth piece and the teat but occassionally a very tight seal may develop.

It will be appreciated that the air line vacuum applied to the pulsator chamber will be maintained substantially inversely proportional to the vacuum in the ring chamber. The following figures are given by way of example as possible settings for the pulsator chamber vacuum when controlled by the vacuum in the ring chamber.

| RING CHAMBER VACUUM | PULSATOR CHAMBER VACUUM |
|---|---|
| 3" | 15" |
| 4" | 15" |
| 5" | 14" |
| 8" | 8" |
| 10" | 5" |
| 15" | 5" |

These figures are given in inches of mercury, and are to be regarded as non-limiting examples.

In use a teat cup embodying the vacuum controlling device as herein described can be used to initially stimulate a cow to let down her milk into a teat, then move into a milking phase and at the end of milking from the teat, will close off the milk vacuum line to prevent vacuum damage to the teat.

Initially, when applied to an unstimulated teat, i.e. where milk let down has not yet been achieved, the teat will be unpressurised and will not fill the teat chamber. Thus vacuum from the milk line may at first have access to the ring chamber. As the milk line vacuum is normally set at 15" (inches) of mercury, the vacuum experienced in the ring chamber will at first be of the order of 15" of mercury. This high vacuum will automatically control the vacuum applied to the pulsator chamber by tending to close valve diaphragm 37 so that the pulsator chamber experiences a low vacuum, of the order of 5" of mercury, depending on the setting of the linkage 38 and spring 42. In which case, the pulsator chamber vacuum being set at a lower vacuum level than the teat chamber vacuum, the pressure differential across the inflation will cause the inflation to close off the teat chamber and thus prevent the high milk vacuum from damaging the unstimulated teat.

By preventing suction on the teat, it is believed that the teat cup crawling will be prevented. In addition, the pulsating of the air line will cause the vacuum in the pulsator chamber to vary between 0" and 5" of mercury. Thus beating the inflation against the teat to stimulate the udder until a let down of milk is achieved.

When the milk has been let down into the teat, the teat will be pressurised by the presence of milk and this will allow the vacuum in the ring chamber to reduce. Consequently, reduction of the ring chamber vacuum will lead to a rise in the vacuum in the pulsator chamber (as the pressure differential across the sensing diaphragm 36 is reduced thereby allowing the valve diaphragm to open) allowing the inflation to open and milking to commence. If at any time, the level of the milk line vacuum drops below the level of the air line vacuum, then the inflation will attempt to "balloon" away from the teat cup allowing increase of vacuum in the ring chamber and thus causing the pulsator chamber to decrease in correspondence with the decrease in the milk line vacuum. Hence the inflation will continue to fit snuggly against the side of the teat.

By this means, it will be appreciated that a single size of teat cup may be provided for a variety of cows and will fit snuggly in each case by virtue of the self compensating pulsator chamber vacuum. In addition, the inflation in continuing to grip the teat sides at all times, will allow the teat cup to be supported without the necessity of additional weights, and will allow the use of a softer mouth piece, and thereby aiding in minimising damage to the teat base. It would be noted that the self compensating pulsator chamber vacuum will tend to reduce the possibility of high vacuum being maintained in the ring chamber. If a high vacuum is initially applied to the ring chamber, this will lead to a low vacuum pulsator chamber, and thus a closing off of the inflation to prevent access of the milk line vacuum to the teat and the ring chamber.

When the teat has finished milking, the teat will deflate thus bringing it back to the same state as before milking commenced, that is, vacuum in the ring chamber will attempt to rise until the vacuum in the pulsator chamber drops to such a point that the inflation closes off the access of the milk line vacuum to the teat. By this means, "ballooning" or pumping of the inflation will be minimised and it is believed that this will prevent the jetting of milk from one teat through to a teat which has finished milking.

A guard or cover, may be mounted over the linkage to prevent damage to the linkage in the event that the teat cup falls off the cow. It will be appreciated that for the purpose of illustration, the linkage and diaphragm has been shown on the exterior of the teat cup, however, the mechanism could be recessed within the casing. Nor is it necessary to provide the sensing diaphragm on the mouth piece or ring chamber as a tube could be connected to the ring chamber with a sensing diaphragm remote from the ring chamber either elsewhere on the teat cup or in fact provided as a separate sensor. In the latter case, it is possible to carry out the method of this invention by providing a separate control unit which could plug into the air line vacuum and also be connected to the ring chamber by means of a sensing tube. However, it will be appreciated that it is preferable to provide the sensing diaphragm as part of the ring chamber to minimise connections to the teat cup.

It will be appreciated that various alterations or modifications may be made to the foregoing without departing from the scope of this invention as set forward in the claims. The claims form part of the disclosure.

I claim:

1. A method of milking an animal including applying a teat cup to a teat to be milked; the teat cup having an inflation and a mouth piece; the interior of the inflation being in communication with a milk line connected to a source of vacuum; the exterior of the inflation being in communication with a pulsating vacuum source; characterised in that the level of vacuum within the mouth piece is monitored and is used to control the level of vacuum applied to the exterior of the inflation.

2. A method as claimed in claim 1 wherein the level of vacuum applied to the exterior of the inflation is maintained substantially inversely proportional to the level of vacuum within the mouth piece.

3. A method as claimed in claim 1 wherein air is allowed to leak into the interior of the mouth piece to vary the vacuum level within the mouth piece.

4. A method as claimed in claim 3 wherein an initial high vacuum level is applied to the interior of the mouth piece prior to let down of milk into the teat, to cause the vacuum level applied to the exterior of the inflation to be reduced to such an extent that the inflation closes off the communication of the milk line with the interior of the inflation.

5. A method as claimed in claim 4 wherein the level of vacuum within the mouth piece is monitored by a sensing diaphragm movable in response to changes in the level of vacuum within the mouth piece.

6. A method as claimed in claim 5 wherein the level of vacuum applied to the exterior of the inflation is controlled by a valve coupled to the sensing diaphragm.

7. A teat cup including: A casing; an inflation mounted within said casing; a mouth piece connected to said inflation; means for sensing a vacuum level within said mouth piece; means for controlling a vacuum level applied to the exterior of said inflation; and means for coupling said sensing means with said vacuum controlling means.

8. A teat cup as claimed in claim 7 wherein the means for controlling the vacuum level consists of a diaphragm valve adapted to close off or restrict communication between a source of pulsating vacuum and the exterior of said inflation.

9. A teat cup as claimed in claim 8 wherein the means for sensing a vacuum level within the mouth piece consists of a sensing diaphragm separating the interior of said mouth piece from atmospheric pressure.

10. A teat cup as claimed in claim 9 wherein the coupling means includes a linkage arm attached to said diaphragm valve and to said sensing diaphragm.

11. A teat cup including: a casing; an inflation mounted within said casing; a mouth piece connected to said inflation; a sensing diaphragm separating the interior of said mouth piece from atmospheric pressure, said sensing diaphragm being capable of sensing a vacuum level within said mouth piece; a diaphragm valve adapted to close off or restrict communication between a source of pulsating vacuum and the exterior of said inflation; and wherein the sensing diaphragm is coupled to the diaphragm valve by a linkage arm pivotally mounted on said casing so that movement of the sensing diaphragm controls movement of the diaphragm valve.

12. A teat cup as claimed in claim 11 wherein the linkage arm is biased away from said sensing diaphragm.

13. A teat cup as claimed in claim 11 wherein the linkage arm is detachably connected to the sensing diaphragm.

14. A teat cup as claimed in claim 13 wherein an air bleed is provided in the mouth piece.

15. A teat cup including: a casing; an inflation mounted within said casing; a mouth piece connected to said inflation; said mouth piece being formed with a relatively thin portion constituting a sensing diaphragm; an air line tube communicating with that portion of the teat cup between the casing and the inflation; said air line tube having a valve therein; a linkage arm pivotally mounted on said casing and interconnecting said sensing diaphragm and said valve whereby movement of said sensing diaphragm causes said valve to open or close.

16. A method of milking an animal including applying a teat cup to a teat to be milked; the teat cup having an inflation and a mouth piece; the interior of the inflation being in communication with a milk line connected to a source of vacuum; the exterior of the inflation being in communication with a pulsating vacuum; vacuum within the mouth piece is monitored by a sensing diaphragm movable in response to changes in the level of vacuum within the mouth piece; and the level of vacuum applied to the exterior of the inflation is controlled by a valve coupled to the sensing diaphragm.

17. A method as claimed in claim 16 wherein the level of vacuum applied to the exterior of the inflation is maintained substantially inversely proportional to the level of vacuum within the mouth piece.

18. A method as claimed in claim 16 wherein air is allowed to leak into the interior of the mouth piece to vary the vacuum level within the mouth piece.

19. A method as claimed in claim 18 wherein an initial high vacuum level is applied to the interior of the mouth piece prior to let down of milk into the teat, to cause the vacuum level applied to the exterior of the inflation to be reduced to such an extent that the inflation closes off the communication of the milk line with the interior of the inflation.

* * * * *